(12) United States Patent
Miskovic (10) Patent No.: US 9,871,810 B1
(45) Date of Patent: Jan. 16, 2018

(54) USING TUNABLE METRICS FOR ITERATIVE DISCOVERY OF GROUPS OF ALERT TYPES IDENTIFYING COMPLEX MULTIPART ATTACKS WITH DIFFERENT PROPERTIES

(71) Applicant: Symantec Corporation, Mountain View, CA (US)

(72) Inventor: Stanislav Miskovic, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 142 days.

(21) Appl. No.: 15/138,129

(22) Filed: Apr. 25, 2016

(51) Int. Cl.
*H04L 29/06* (2006.01)

(52) U.S. Cl.
CPC ...... *H04L 63/1416* (2013.01); *H04L 63/1433* (2013.01)

(58) Field of Classification Search
CPC ................. H04L 63/1416; H04L 63/1433
See application file for complete search history.

(56) References Cited

U.S. PATENT DOCUMENTS

| | | | |
|---|---|---|---|
| 7,716,739 B1 | 5/2010 | Mccorkendale | |
| 8,607,346 B1* | 12/2013 | Hedge | H04L 63/1416 726/11 |
| 9,009,828 B1* | 4/2015 | Ramsey | H04L 63/1416 709/223 |
| 2003/0154399 A1* | 8/2003 | Zuk | H04L 63/0254 726/11 |
| 2005/0216955 A1* | 9/2005 | Wilkins | H04L 63/083 726/23 |
| 2011/0016528 A1* | 1/2011 | Zhou | H04L 41/0677 726/23 |

(Continued)

OTHER PUBLICATIONS

Abad, C. et al., "Log Correlation for Intrusion Detection: A proof of concept," Computer Security Applications Conference, 2003, Proceedings, Dec. 8-12, 2003, 10 pages, Las Vegas, NV.

(Continued)

*Primary Examiner* — Hadi Armouche
*Assistant Examiner* — Sher A Khan
(74) *Attorney, Agent, or Firm* — Patent Law Works LLP (57) ABSTRACT

Tunable metrics are used for iterative discovery of groups of security alerts that identify complex, multipart attacks with different properties. Alerts generated by triggering signatures on originating computing devices are iteratively traversed, and different metrics corresponding to alerts and alert groups are calculated. The calculated metrics quantify the feasibility of the evaluation components (alerts and/or alert groups) for inclusion in tuples identifying multipart attacks with specific properties. Alerts and successively larger alert groups are iteratively joined into tuples, responsive to evaluation components meeting thresholds based on corresponding calculated metrics. Only those evaluation components that meet specific thresholds based on the calculated metrics are added to alert groups. Metrics are only calculated for those components that have met corresponding metric-based thresholds during prior iterations. Discovered tuples can be transmitted to multiple endpoint computing devices, where the tuples can be utilized as signatures to detect and defend against multipart attacks.

19 Claims, 6 Drawing Sheets

(56) References Cited

U.S. PATENT DOCUMENTS

| 2011/0138470 | A1* | 6/2011 | Davis | G06F 21/564 |
| | | | | 726/25 |
| 2014/0337974 | A1* | 11/2014 | Joshi | H04L 63/1425 |
| | | | | 726/23 |
| 2016/0036837 | A1* | 2/2016 | Jain | H04L 63/1416 |
| | | | | 726/23 |
| 2016/0301709 | A1* | 10/2016 | Hassanzadeh | H04L 63/1433 |
| 2017/0171757 | A1* | 6/2017 | Smith | H04W 12/12 |

OTHER PUBLICATIONS

Cuppens, F. et al., "Alert Correlation in a Cooperative Intrusion Detection Framework," IEEE Symposium on Security and Privacy, May 12-15, 2002, 14 pages, Oakland, CA.

Gu, G. et al., "BotHunter: Detecting Malware Infection Through IDS-driven Dialog Correlation," 16th USENIX Security Symposium, Aug. 6-10, 2007, pp. 167-182, Boston, MA.

Ning, P. et al., "Constructing Attack Scenarios through Correlation of Intrusion Alerts," ACM Conference on Computer and Communications Security, Nov. 18-22, 2002, 10 pages, Washington D.C.

Valdes, A. et al., "Probabilistic Alert Correlation," Proceedings of the 4th International Symposium on Recent Advances in Intrusion Detection, Oct. 10-12, 2001, pp. 54-68, Davis, CA.

* cited by examiner

Grouping based on Joining Potential thresholds

FIG.6

USING TUNABLE METRICS FOR ITERATIVE DISCOVERY OF GROUPS OF ALERT TYPES IDENTIFYING COMPLEX MULTIPART ATTACKS WITH DIFFERENT PROPERTIES

TECHNICAL FIELD

This disclosure pertains generally to computer security, and more specifically to using tunable metrics for iterative discovery of groups of alert types identifying complex multipart attacks with different properties.

BACKGROUND

Computer security systems utilize signatures of known malicious code or activities to identify specific attacks. Commercial security system vendors maintain large collections of such signatures which are created over time based on security research and the monitoring of malicious activity across a wide base of organizations and endpoints. The triggering of an individual signature points to an individual security problem, such as java script trying to communicate with a known malicious host, a given fake antivirus advertisement, a reconnaissance of browser plugins, a suspicious port scan, a Flash presence, a network service deficiency, an operating system exploit, etc. When triggered, a signature generates a specific alert concerning the corresponding security issue.

However, contemporary complex attacks consist of multiple malicious activities, which get partly detected as individual security problems, but preclude analysts from understanding the attacks as a whole, i.e., as well orchestrated activities aimed at progressively diminishing security of targeted systems. These complex attacks can use multiple steps to probe, infect and maintain a presence on systems. Such complex multipart attacks are not described by single signatures. A single alert provides no information concerning what previous malicious events are likely to have occurred, or what attempted malicious activity is likely to follow.

Different complex multipart attacks can also behave very differently from one another, which creates additional detection challenges. For example, one complex attack could be in the form of an exploit of a vulnerability that was newly discovered by a malicious party, and as yet remains unknown to security vendors. For this reason, the attack could be carried out directly through a few highly targeted actions, without a need to obfuscate the attack strategy too much. The only alerts generated by this complex attack could be largely immutable sequences of generic or side-effect alerts, corresponding to actions such as hosts communicating with suspicious infrastructures, a large number of broken connections, sudden increased CPU usage, etc. Although these events are all part of a multipart attack, they would not conventionally register as being related.

On the other hand, another complex attack could act completely differently and raise many alerts, for example while trying different exploits available in a known exploit kit. A complex attack of this type would typically attempt to mask its activities, for example by employing stealthy probing (e.g., via fake ads), by reshuffling the sequences of its multiple activities, by throwing "bait" alerts, etc. This creates noise and triggers multiple inconclusive alerts.

Whereas both above-described attacks are complex and multipart, identifying and characterizing direct multipart attack strategies is a very different task from identifying and characterizing noisy activities associated with particular exploit stages of a stealthy multipart attack.

It would be desirable to address these issues.

SUMMARY

Tunable metrics are used for iterative discovery of groups of security alerts that identify complex, multipart attacks with different properties. Alerts generated by triggering signatures on originating computing devices are identified in given samples of security telemetry (for example, massive security telemetry received from multiple points of origination). The identified alerts can contain, for example, identifiers of the triggering signatures, identifiers of the invoking sources, and identifiers of the given computing devices on which the given alerts were generated. Alerts can also be identified by type.

The identified alerts are iteratively traversed, and different metrics corresponding to alerts and alert groups are calculated. The calculated metrics quantify the feasibility of the evaluation components (i.e., alerts and/or alert groups) for inclusion in tuples identifying multipart attacks with specific properties. Alerts and successively larger alert groups are iteratively joined into tuples, responsive to evaluation components meeting thresholds based on corresponding calculated metrics. More specifically, metrics corresponding to evaluation components are iteratively calculated, and only those evaluation components that meet specific thresholds based on the calculated metrics are added to alert groups, thereby identifying successively larger alert groups that describe given multipart attacks with different properties. During a first iteration, specific metrics can be calculated corresponding to individual alerts, and during subsequent iterations, metrics are only calculated for those alerts or alert groups that have met corresponding metric-based thresholds during prior iterations. Metric-based thresholds can be adjusted between iterations, based on properties of multipart attacks for which evaluation components are being identified. Discovered tuples can be transmitted to multiple endpoint computing devices, where the tuples can be utilized as signatures to detect and defend against multipart attacks.

One specific metric that can be calculated for evaluation components is relevance. The relevance metric quantifies the likelihood of individual sources generating a corresponding specific alert or alert group. The relevance metric for a given evaluation component can be calculated as a function of i) the total number of sources in the sample of security telemetry and ii) the number of sources in the sample of security telemetry that generate the given evaluation component. In one embodiment, this metric is calculated by dividing the number of sources in the sample of security telemetry that generate the evaluation component by the total number of sources in the sample of security telemetry. During a first iteration, relevance metrics can be calculated for individual alerts, and during subsequent iterations, relevance metrics can be calculated for alert groups that have not been eliminated from further consideration as a result of failing to meet a metric-based threshold.

In some embodiments, the next specific metric calculated is joining potential, which can be calculated for evaluation components that have not been previously eliminated from further consideration for failing to meet the relevance metric threshold. The joining potential metric can be calculated for pairs of evaluation components, and quantifies an assessment of the likelihood of the two evaluation components of a given pair having a threshold quantity of common originating sources. The joining potential metric corresponding to a specific pair of evaluation components can be calculated as a function of the disparity between the relevance metrics of the two evaluation components of the pair. During a first iteration, joining potential metrics corresponding to pairs of alerts can be calculated, and during subsequent iterations, joining potential metrics can be calculated for successively larger alert groups and additional alerts, wherein the alert groups and additional alerts have not been previously eliminated from further consideration for failing to meet a metric-based threshold. The joining potential metric threshold can be set to a value of approximately one in order to identify evaluation components that are triggered by about an equal number of sources, and can be lowered (e.g., prior to a subsequent iteration) to identify evaluation components with varied distribution across originating sources.

In some embodiment, the next calculated metric is commonality, which quantifies the discrepancy between an actual number of common sources for both evaluation components of a specific pair, and the number of common sources for the components of the pair as predicted by the corresponding joining potential metric. The commonality metric for a specific pair of evaluation components can be calculated, for example, by dividing the relevance metric of the specific pair of evaluation components by the minimum relevance metric of the individual evaluation components of the pair. The commonality metric threshold can be set to about one in order to discover evaluation components that occur as often as the multipart attack of which they are a part, or lowered to discover evaluation components that occur more frequently. In some embodiments, the next metric calculated is tuple growth. Tuple growth quantifies the likelihood of a specific identified alert group being grown by the addition of a specific additional alert. This metric can be calculated, for example, by dividing the relevance metric corresponding to the combination of the identified alert group and the additional alert by the relevance metric corresponding to the specific additional alert itself.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
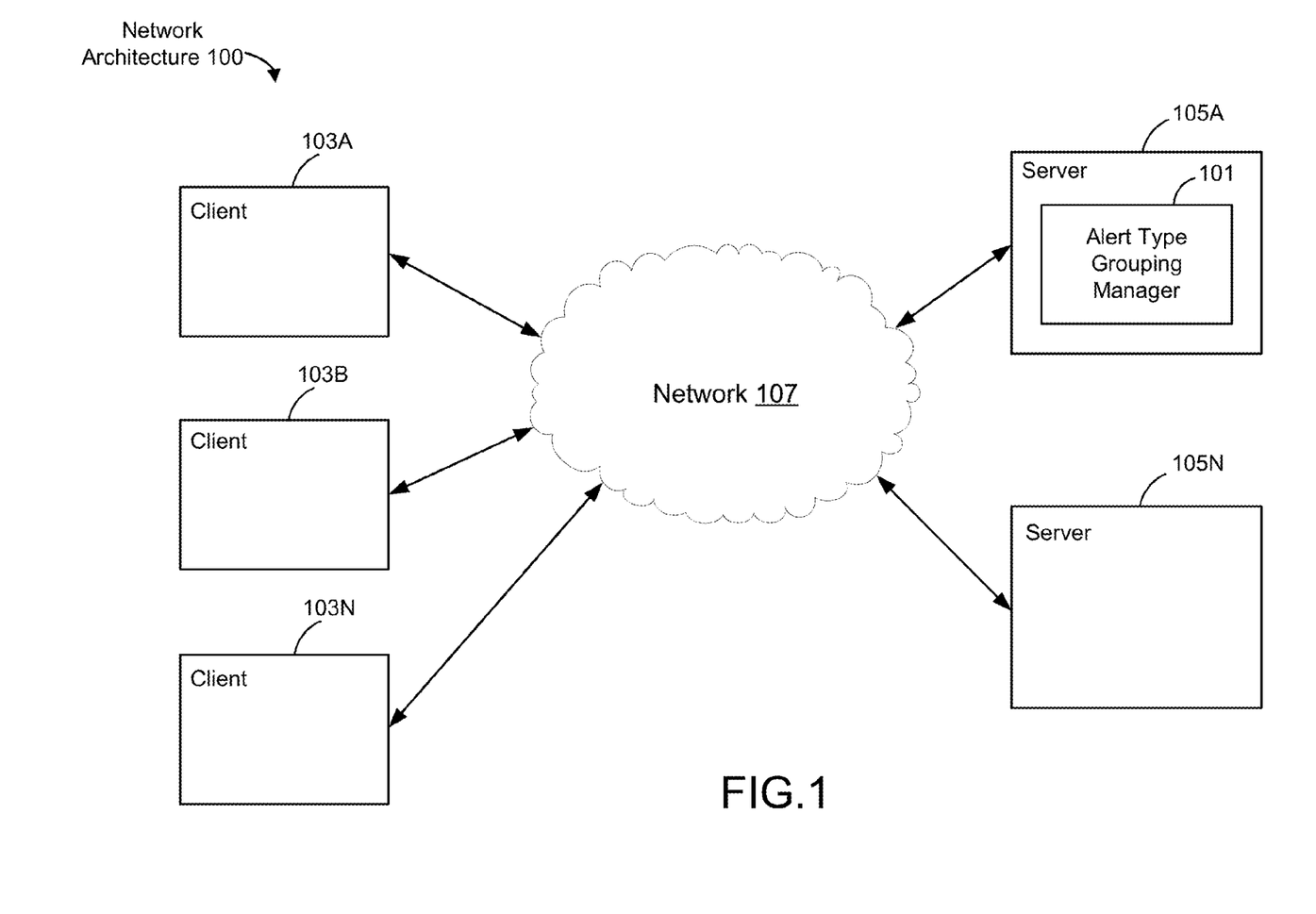
FIG. 1 is a block diagram of an exemplary network architecture in which an alert type grouping manager can be implemented, according to some embodiments.

FIG. 1 is a block diagram illustrating an exemplary network architecture 100 in which an alert type grouping manager 101 can be implemented. The illustrated network architecture 100 comprises multiple clients 103A, 103B and 103N, as well as multiple servers 105A and 105N. In FIG. 1, the alert type grouping manager 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
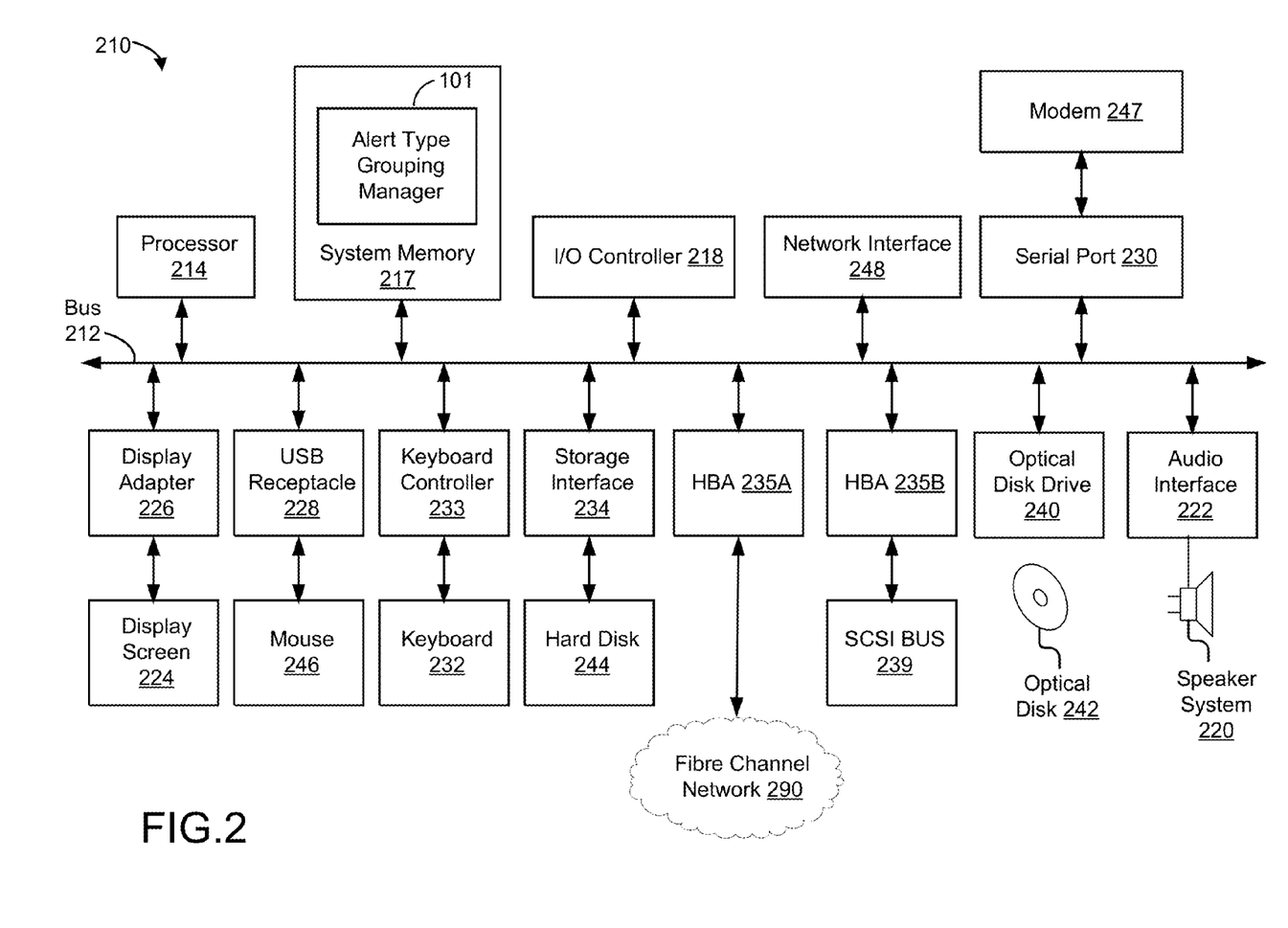
FIG. 2 is a block diagram of a computer system suitable for implementing an alert type grouping manager, according to some embodiments.

FIG. 2 is a block diagram of a computer system 210 suitable for implementing an alert type grouping manager 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the alert type grouping manager 101 is illustrated as residing in system memory 217. The workings of the alert type grouping manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
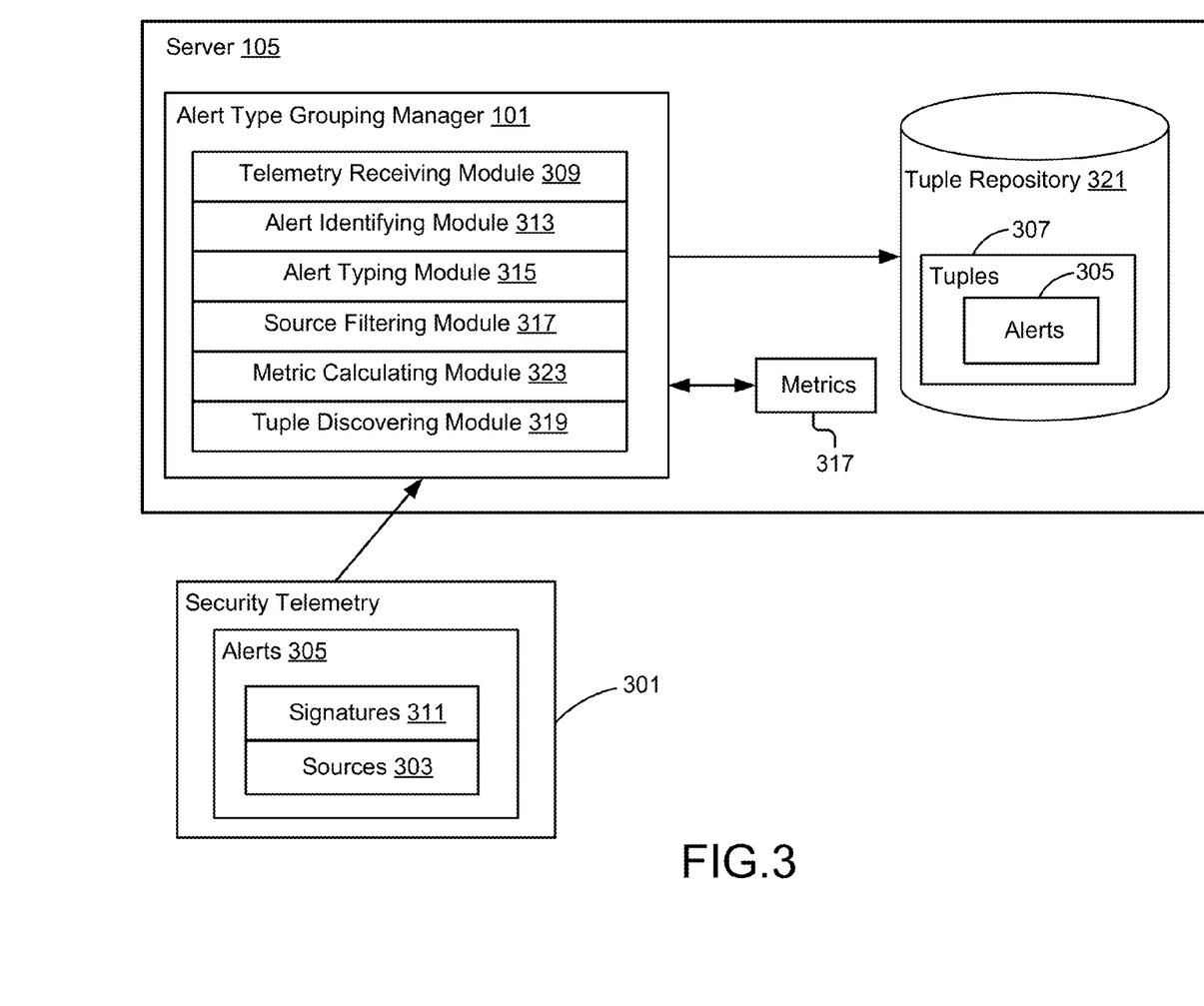
FIG. 3 is a high level block diagram of the operation of an alert type grouping manager, according to some embodiments.

FIG. 3 illustrates the operation of an alert type grouping manager 101 running on a server 105. As described above, the functionalities of the alert type grouping manager 101 can reside on specific computers 210 or be otherwise distributed between multiple computer systems 210, including within a fabric/cloud-based computing environment in which the functionality of the alert type grouping manager 101 is provided as a cloud based service over a network 107. In some embodiments, the alert type grouping manager 101 is centralized on one or more servers 105 that handle computer security for a large user base, such as a commercial security vendor, or a security division of a large organization. It is to be understood that although the alert type grouping manager 101 is illustrated in FIG. 3 as a single entity, the illustrated alert type grouping manager 101 represents a collection of functionalities, which can be instantiated as a single or multiple modules as desired (instantiation of a specific, multiple module alert type grouping manager 101 is illustrated in FIG. 3). It is to be understood that the modules of the alert type grouping manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the alert type grouping manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As described in detail below, the alert type grouping manager 101 identifies alert types and their originating sources 303 in security telemetry 301, and iteratively calculates and applies certain metrics 317. This enables the alert type grouping manager 101 to discover and characterize alert type groupings that identify complex, multipart attacks with different properties. The triggering of alerts 305 by different attack sources 303 can be observed by analyzing security telemetry 301 centrally collected (e.g., by a provider/vendor of computer security services) from a large user base. The telemetry 301 contains a record of specific alerts 305 triggered on various endpoints and traceable to specific attack sources 303. The iterative application of metrics 317 enables discovery of successively larger groups of alert types corresponding to the multiple activities, resources and vulnerabilities used in combination by specific complex attacks. Such discovered alert groups are referred to herein as tuples 307. Tuples 307 comprise identified groups of alert types representative of the actions employed during complex attacks.

As explained in detail below, the alert type grouping manager 101 can discover tuples 307 describing multipart attacks with very different properties by iteratively calculating metrics 317 corresponding to alert types and groups thereof, and successively adding to alert groups only those alerts/groups that meet given thresholds based on the metrics 317. This iterative processing is used to identify successively larger groups of alert types that describe given complex attacks. As described in detail below, the thresholds to use to determine which alerts and groups are joined can be adjusted between embodiments and iterations, depending upon the properties of the attacks which the alert type grouping manager 101 is currently attempting to identify. By setting the thresholds as desired and iteratively constructing groups of alert types, the alert type grouping manager 101 thus discovers tuples 307 that can be used for detection of complex attack campaigns with different properties as desired.

The analysis begins with individual alerts 305 triggered by various sources 303, as learned from the telemetry 301. The alert type grouping manager 101 uses different metrics 317 to attempt to group alerts 305 into groups (tuples 307) that best describe given complex attacks with specific properties. For example, starting from a collection of alerts s1, s2, s4, s5, s10, s12 . . . in the telemetry 301, the alert type grouping manager 101 could iteratively discover that, for example, the group (s1, s4) is feasible, based on the calculation and application of metrics 317 corresponding to attacks with certain properties. In other words, the metrics 317 indicate that alerts s1 and s4 are both plausible components of an attack with given properties, for which the alert type grouping manager 101 is currently attempting to discover tuples 307. In the next iteration, the alert type grouping manager 101 discovers that, e.g., group (s1, s4, s10) is also feasible (that is to say, it is feasible to grow group (s1, s4) by adding alert s10). In a final iteration, it could be discovered that a given complex attack is best described by group (s1, s4, s10, s12).

After calculating metrics 317, the alert type grouping manager 101 optimizes processing by specific application of thresholds in order to determine whether given alerts 305 are feasible for grouping and/or tuple 307 growth. Such optimization is especially important as a preparation step for subsequent alert-grouping iterations: Each such iteration involves costly processing of alert telemetry and searching for feasible alert type group growth candidates in a combinatorial space that gets exponentially larger at each iteration (i.e., group length). The optimization alleviates these costs by (i) eliminating infeasible alert groups in the current iteration and (ii) identifying alert groups that are feasible to grow further in a subsequent iteration according to the attack behavior of current interest. Therefore, by using metric-based thresholds to identify subsets of the alert types and subsequently created groups thereof, the iterative processing remains practicable despite the corresponding exponential growth of the search space. Metrics 317 are calculated for specific alerts/groups, and the thresholds are used as upper and/or lower bounds for inclusion in continued analysis. The use of metric-based thresholds in this capacity is described in detail below.

It is to be understood that centrally collected security telemetry 301 can be received by a telemetry receiving module 309 of the alert type grouping manager 101 from a large number (e.g., hundreds, thousands, tens of thousands) of participating endpoints and organizations (not illustrated). Deployed organization and/or endpoint level security products can be set to transmit this security telemetry 301 to the centralized (e.g., cloud based) alert type grouping manager 101. The telemetry receiving module 309 can be provided with updated telemetry 301, e.g., periodically, continually or on demand, thereby maintaining current information from the various organizations. The frequency at which organizations transmit updated telemetry 301 is a variable design parameter, which can be set as desired according to different scenarios. The large base of security telemetry 301 collected from the many points of origination over time can be referred to as "massive telemetry."

The type, content and specific format of the security telemetry 301 can vary between embodiments and points of origination. Security telemetry 301 can be in the form of, for example, security system generated scanning or other assessment data, monitoring data from firewalls, network intrusion detection systems (IDS) or network intrusion prevention systems (NIPS), log data from network or other computing devices, etc.

The alert type grouping manager 101 takes security telemetry 301 as input, and analyzes the telemetry 301 in order to identify specific indications of alert grouping used for discovering and characterizing the tuples 307. The telemetry 301 is generally sizeable and noisy. In this context, the alert type grouping manager 101 can analyze a given sample of security telemetry 301. In some embodiments, the telemetry 301 collected during a given period of time is analyzed as a sample, such as three days, one week, ten days, etc. In other embodiments, other criteria are used to define a sample (e.g., size).

An alert identifying module 313 of the alert type grouping manager 101 identifies alerts 305 in given samples of the security telemetry 301 generated by the triggering of signatures 311. It is to be understood that signatures 311 are maintained by a security vendor or the like as described above. In some embodiments, the set of signatures 311 is maintained by the provider of the alert type grouping manager 101 in the context of the provision of other security services. The signatures 311 themselves are not part of the security telemetry 301 itself, but are used in the context of analyzing the security telemetry 301. It is to be noted that security systems at the points of origination of the security telemetry 301 detect attempted malicious activities and other actions that trigger specific signatures 311 of the group maintained by the security vendor, generating specific alerts 305. The generating of the alert 305 is logged at the point of origination, and included in the security telemetry 301. In other words, when an event, action, downloaded file or other indicator triggers a signature 311 on an endpoint or organizational entity collecting security telemetry 301, the trigger of the signature generates an alert 305 which is logged to the security telemetry 301. Because the alert identifying module 313 is analyzing massive security telemetry 301 from many points of origination, it is able to identify alerts 305 generated across a wide endpoint base. Such alerts 305 in the security telemetry 301 can contain data such as (i) identifiers and/or descriptions of the triggering signatures 311, identification of the alert-invoking sources 303 (e.g., the attacking machine's Internet Protocol (IP) address, domain and/or other identifying information) and (ii) an identifier of the reporting entity (e.g., the victim computer's IP address, machine ID, etc.).

Each alert 305 in the sample of security telemetry 301 being analyzed is identified, along with its source 303 and target. It is to be understood that individual alerts 305 are generated in response to the triggering of individual signatures 311. However, multiple signatures 311 can identify the same type of malicious activity. In other words, twenty different signatures (potentially from different security devices) could identify twenty different known units of malicious code on a given computer 210, e.g., in an instance where an attack is uploading multiple malicious files or different re-packaged versions of the same malicious file. In some embodiments, the identification of alerts 305 in the sample of security telemetry 301 focuses on alert types, as opposed to specific alerts 305 indicating different actions of the same type. For example, the alert identifying module 313 could identify all alerts 305 of the type "suspicious port scanning" as opposed to the individual alerts 305 generated by the multiple signatures 311 indicative of different port scanning operations. Because the alerts 305 in the security telemetry 301 include an identification for the triggering signature 311, the alert type grouping manager 101 can match given triggering signatures to types. In some embodiments, the taxonomy of signatures 311 and their corresponding alerts 305 is performed by the security system outside of the operation of the alert type grouping manager 101. This information can then be stored, for example in conjunction with the group of signatures 311, and accessed by the alert type grouping manager 101. In other embodiments, an alert typing module 315 of the alert type grouping manager 101 classifies different alerts 305 into types. In either case, this typing can be updated as desired, and can be at any desired level of granularity. Some examples of alert types according to some embodiments are port scanning, Flash presence, browser type or plugin reconnaissance, fake anti-virus notification, fake add, one of multiple variations of a specific attack activity, SQL injection, attempted exploitation of a specific OS or network vulnerability, phishing attempt, detection of a non-trusted USB device, drive by shell code planting, suspicious file copying, presence of key logger, DDoS zombie spreading activity, etc. The specific types to utilize and the specific assignment of given alerts 305 to given types are variable design parameters, and can be adjusted as desired.

In addition to isolating a sample of the security telemetry 301 for analysis as described above, in some embodiments the alert type grouping manager 101 also filters the sample of security telemetry 301 to identify a subset most likely to be potentially relevant to the discovery of tuples 307. In one embodiment, the alert type grouping manager 101 filters out alerts 305 that were originated from sources 303 with private IP addresses. Thus, in this embodiment, only alerts 305 corresponding to attack sources 303 with public IP addresses are analyzed. This ensures reliable identification of those attack sources (e.g., hosts or networks) with public IP addresses, without risking that the dynamic allocation of private IP addresses (DHCP) blurs actions originating from many unrelated attack sources 303. For example, DHCP create such ambiguities by assigning the same private IP address (such as 172.16.0.1) to sources 303 in different companies. Multiple alerts 305 appearing to originate from the same private IP addressed source 303 could thus actually originate from multiple computers in multiple organizations. It is to be understood that attacks can also originate from sources 303 with private IP addresses (such as in the cases of worm spreading or insider threats).

In some embodiments, the alert type grouping manager 101 filters sources 303 using other criteria, instead of or in addition to the public/private IP address filtering described above. For example, in one embodiment after filtering out sources 303 with private IP addresses, the other filtering can reduce the input volume of security telemetry 301 by identifying sources 303 adjudicated most likely to be launching complex multipart attacks. For example, a source 303 attempting to launch a complex multipart attack typically attempts to launch diverse suspicious operations (e.g., port scanning, luring the user to click on a malicious URL through the launch of a fake anti-virus alert, attempting to exploit one or more specific OS holes, etc.). These different operations will trigger multiple signatures 311 which in turn will generate alerts 305 of different types. Thus, sources 303 that originate more types of alerts 305 (as opposed to more instances of a single alert type) are considered more likely to be launching complex attacks. In one embodiment, this can be quantified by counting the number of alert types originated by each sources 303. This information is in the telemetry 301 and can be gleaned by analysis thereof. For example, a hash set of triggered alert types can be associated with each source 303, and the set-size tally per source 303 examined (this is just an implementation option for alert type counting utilized in a particular embodiment). Those sources 303 that do not meet a given threshold of generated alert types can then be filtered out. For example, the alert type grouping manager 101 can establish a threshold T on the number of distinct types of alerts per candidate source 303 required to be adjudicated sufficiently likely of being a complex attack launching platform. All sources 303 in the set of telemetry 301 that do not meet T are then filtered out, keeping only those sources 303 that meet the threshold for further processing as described below. The specific threshold to use is a variable design parameter (e.g., two, four, seven).

The filtering stage is informed by properties/limitations of multipart attackers. First, attackers generally launch multiple types of attempted operations before succeeding to compromise a target. Different ones of these attempts trigger different types of alerts. Secondly, attackers have limited infrastructure options (e.g., they can launch attacks from their own individual machines (naively), or coopt underground clouds/CDNs, or hide their attacks underneath legitimate looking services in limited public infrastructures (such as Amazon AWS). Ultimately, these two properties result in the sources 303 of complex multipart attacks raising more diversified sets of alert types than other sources 303. Leveraging this, the alert type grouping manager 101 optimizes selection of candidate attack sources 303, by filtering out those that generate fewer alert types.

In other embodiments, other filters can be employed on the candidate sources 303 in the security telemetry 301 in addition to (or instead) of those described above. For example, the alert type grouping manager 101 can also include auxiliary counting metrics 317 in order to identify a subset of suspicious sources 303 more confidently. Such auxiliary counting can include the numbers of targets per source 303, the total number of alerts 305 of any type per source 303, etc. Also, different signatures 311 can be weighted higher or lower, for example based on confidence in the signature 311 identifying a bona fide attack versus merely suspicious activity, etc.

In order to discover and characterize tuples 307 identifying complex attacks with given characteristics, a tuple discovering module 319 of the alert type grouping manager 101 iteratively traverses the set of discovered alert types from the sample of security telemetry 301. During each iteration, a metric calculating module 323 of the alert type grouping manager 101 calculates specific metrics 317 for the individual alerts (in the first phase of the first iteration), and subsequently for feasible/surviving alert groups. An example in which a specific set of metrics 317 is calculated and applied in a specific way according to one embodiment is described below, but it is to be understood that in other embodiments additional or different metrics 317 can be utilized as desired.

In one embodiment, the first calculated metric 317 is a measure of how relevant an alert type (or group of alert types) is within a given set of suspicious sources (e.g., the sources 303 in the sample of telemetry 301, after any pre-filtering as described above). This metric 317 is referred to herein as "relevance." The relevance metric 317 RELEVANCE can be thought of as indicating the likelihood of individual sources 303 (i.e., sources 303 in the reference sample of telemetry 303) triggering a given alert type (in the first iteration) or a given group of alert types (in subsequent iterations). More specifically, for a set of sources M, and a subset of sources Sm which triggered the alert type (or which triggered each alert type in the group) s, the alert relevance R(s) can be calculated as R(s)=|Sm|/|M|. The relevance metric $317_{RELEVANCE}$ can be calculated according to different formulae in different embodiments, but generally this metric 317 is a function of i) the total number of sources 303 in the sample, and ii) the number of sources 303 in the sample that generate the specific alert type (or group). Only those alert types (in the first iteration) or groups of alert types (in subsequent iterations) with a relevance metric 317 RELEVANCE meeting a given threshold are adjudicated as being sufficiently relevant to be further analyzed against additional metrics 317 as described below. Any alert or group that does not meet this threshold is adjudicated as not being sufficiently likely to be a component of a complex attack with currently relevant properties, and is not processed further. The specific threshold to use is a variable design parameter which can be adjusted up and down as desired (e.g., 80%, 50%, 10%, etc.) between embodiments and/or iterations as desired, for example depending upon the properties of complex attacks for which identifying tuples 307 are currently being discovered. In some embodiments, rather than a percentage or ratio, the threshold can be in the form of a constant (e.g., at least X sources 303 within the set).

It is to be understood that the relevance metric $317_{RELEVANCE}$ is not computationally expensive to calculate, so using it as the first cut off for further processing of alert types/groups is efficient. The relevance metric $317_{RELEVANCE}$ can be calculated in the first iteration for all individual alert types in the telemetry 301 sample, and in subsequent iterations for those groups of alert types that meet the additional metric-based thresholds described below. The relevance metric $317_{RELEVANCE}$ serves as a basic confidence measure in the grouping of alerts types and in the growing of existing groups into tuples 307 describing complex attacks with given properties. Note that in the embodiment being described, the relevance metric $317_{RELEVANCE}$ is further used as a basis for the additional metrics 317. Thus, the whole tuple 307 discovery process can be built based on the information extrapolated from calculating alert relevance (e.g., the total set of sources 303 in the telemetry 301, and which subsets of sources 303 triggered which alert types).

In one embodiment, the next metric 317 calculated for those alert types/groups that meet the relevance threshold is an assessment of the likelihood that two alert types (or a group and an additional alert type) have a threshold quantity of originating sources 303 in common, based on their respective relevance metrics $317_{RELEVANCE}$. This metric 317 is referred to herein as "joining potential." The joining potential metric $317_{JOINING}$ quantifies the potential for combining a first alert (or group) with a second alert (or group). For semantic clarity, the phrase "evaluation component" is used herein to mean an alert or an alert group. More broadly, the joining potential metric $317_{JOINING}$ is an assessment of whether a given combination of evaluation components would be sufficiently relevant. The joining potential metric 317 JOINING can be thought of as a quantification of the general distribution of the triggering of individual alert types/groups among sources 303 in the telemetry 301 sample (e.g., a measure of global balance in the telemetry 301), indicating which ones are feasible for further grouping under the targeted selection criteria (e.g., the attack properties of current interest). More specifically, to calculate the joining potential of a first evaluation component sx with a second evaluation component sy, the joining potential J can be calculated as J(sx, sy)=min(R(sx), R(sy))/max(R(sx), R(sy)), where R equals relevance. In other words, the joining potential metric 317 JOINING is a quantification of the evaluation of whether it is feasible to join sx and sy to identify attack (sx, sy). In other embodiments the exact formula used to calculate joining potential can vary. Generally, joining potential is a function of the disparity between the relevance of the two evaluation components being evaluated for potential grouping. It is to be understood that in the first iteration the joining potential metric $317_{JOINING}$ is calculated for pairs of single alert types with relevance metrics $317_{RELEVANCE}$ meeting the threshold (e.g., the joining potential for alert types sx with alert type sy), and in subsequent iterations the joining potential metric $317_{JOINING}$ is calculated for successively larger groups with other alert types (e.g., the joining potential for group (sx, sy) with alert type sz, for group (sx, sy, sz) with alert type sn, etc.).

Figure 4A:
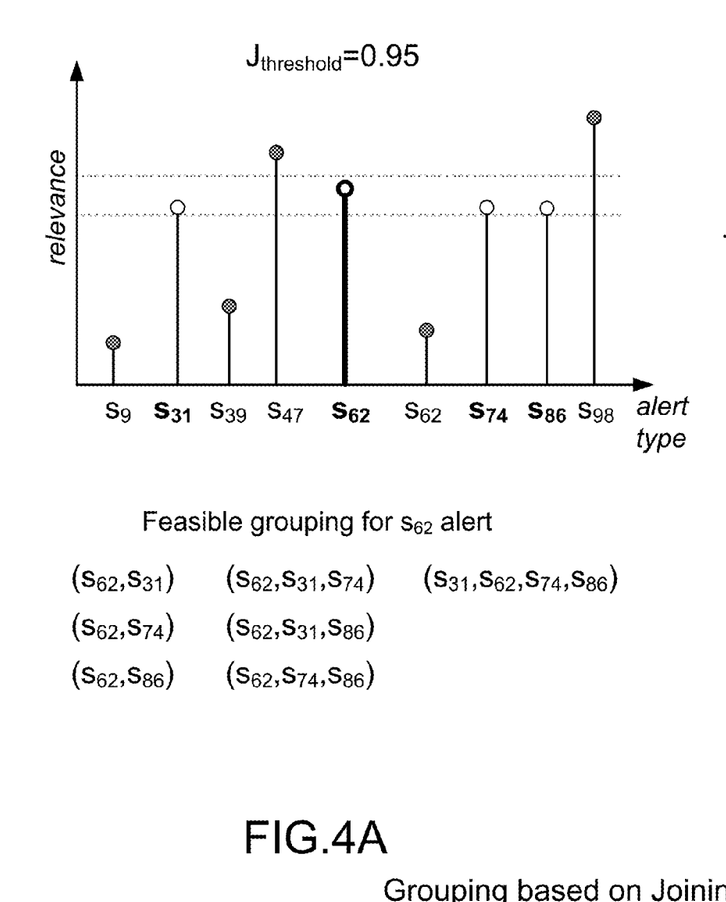
FIG. 4A is a graph showing feasible grouping of alert types according to a relatively high joining potential threshold, according to one embodiment.
Figure 4B:
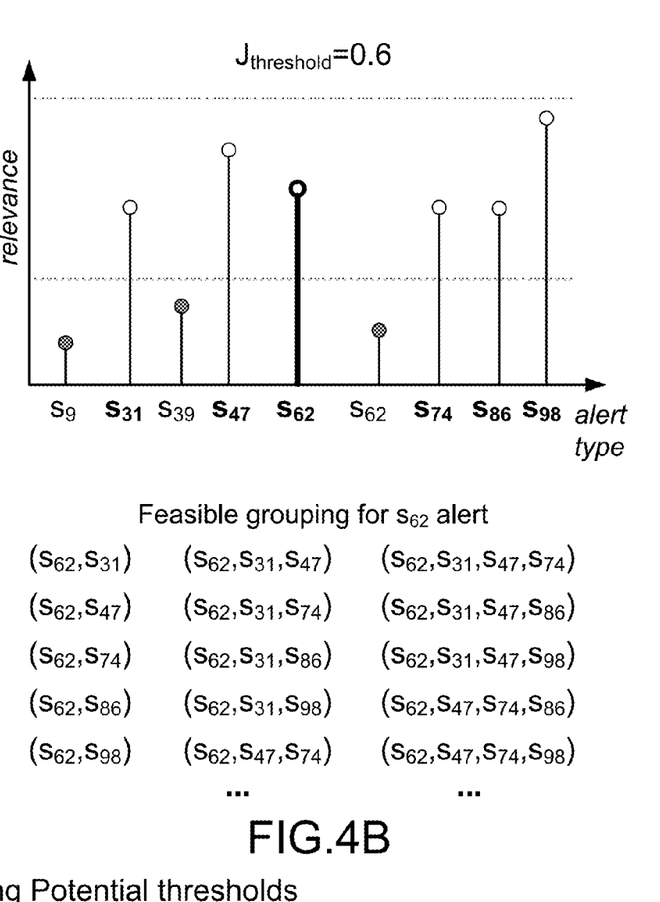
FIG. 4B is a graph showing feasible grouping of alert types according to a relatively low joining potential threshold, according to one embodiment.

Those groups with a joining potential metric $317_{JOINING}$ meeting a given threshold are further analyzed as described below. The threshold to use for joining potential is a variable design parameter, which can be set based on the characteristics of multipart attacks for which identifying tuples 307 are currently being constructed. For example, to identify attacks whose components are triggered by about an equal number of sources 303, the threshold for J would be set to about 1. On the other hand, to allow for more variation in the distribution of alerts across originating sources 303 (e.g., for attacks with broader probing), a lower threshold could be set, for example J=0.5. The threshold setting 0.5 means that some alerts included in the multipart attack in question can be triggered by twice as many different sources 303 as other alerts in the attack. This concept is illustrated by FIG. 4A, which illustrates feasible alert grouping according to an example joining potential threshold of 0.95 and FIG. 4B, which illustrates feasible alert grouping according to an example joining potential threshold of 0.6. Note also that the joining potential threshold to use can be adjusted between iterations. For example, a first iteration could allow for a large discrepancy between alert types (a low threshold), reflecting, e.g., that many different sources 303 trigger pop-up ads. Because, for example, only a small percentage of the pop-up adds include a malicious link, the distribution across sources 303 would be expected to be less diffuse in the second iteration, and thus the threshold could be raised. This scenario is just an example of adjusting the joining potential threshold between iterations according to a presumed type of complex attack for which the alert type grouping manager 101 is attempting to discover tuples 307.

It is to be noted that the input data for calculating the joining potential metric 317 JOINING are available from previous iterations, thereby enabling identification of further feasible grouping candidates without excessive computational resource utilization. For example, to address the alert pair (sx, sy), the values R(sx) and R(sy) are readily available from the previous iteration which addressed single alerts sx and sy. Looking at triplet (sx, sy, sz), the value R(sx, sy) is available from the pairs iteration and R(sz) is available from the singleton iteration.

Figure 5A:
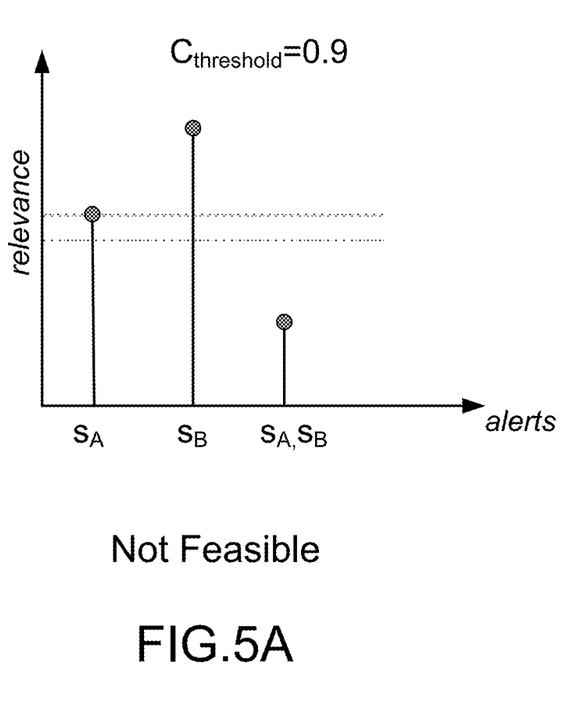
FIG. 5A is a graph showing how a grouping of specific alert types is not feasible according to a relatively high commonality threshold, according to one embodiment.
Figure 5B:
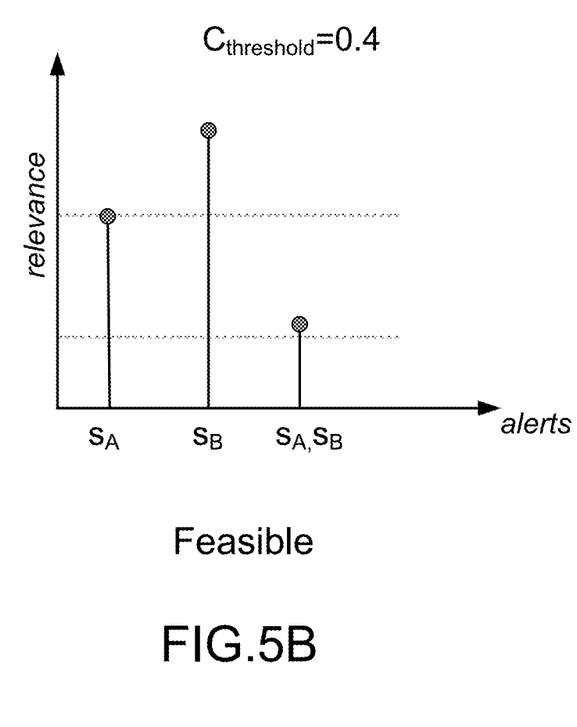
FIG. 5B is a graph showing how a grouping of specific alert types is feasible according to a relatively low commonality threshold, according to one embodiment.

The next metric 317 utilized in the embodiment being described measures the discrepancy between the actual number of sources 303 in common for the units being analyzed and what was predicted by the joining potential metric. This metric 317 is referred to herein as commonality. Commonality (C) of (sx, sy) can be calculated as C(sx, sy)=R(sx, sy)/min(R(sx), R(sy)). Generally, the alert group (sx, sy) can only be triggered by up to a "normalized" count of min(R(sx), R(sy)) sources 303. Thus, setting a lower-bound threshold of C~=1 would indicate that (sx, sy) is triggered about as often as one of its internal components. For lower values of C, component alerts would be "allowed" to occur more disjointedly than they occur jointly. Thus, lower commonality metric thresholds can (i) identify alerts which occur in many other types of attacks (not only in (sx, sy)), or (ii) characterize cases of sx and sy as being unlikely to constitute a common attack. FIGS. 5A and 5B illustrate how a given grouping is not feasible under an example commonality threshold of 0.9, but is feasible under an example commonality threshold of 0.4. It is to be understood that calculating the commonality metric $317_{COMMONALITY}$ is computationally costlier than relevance or joining potential, because its component R(sx, sy) needs to be calculated in the current iteration by processing alerts from all feasible attack sources. However, the functionality described herein reduces this cost by incurring it only for those feasible candidates that meet the relevance and joining-potential thresholds. Those candidates which meet the commonality threshold are processed further as described below. As with other thresholds, the specific values used for commonality thresholds can vary between embodiments, be adjusted based on attack properties under investigation, and/or be adjusted between iterations as desired. Note that the numerator of the commonality metric $317_{COMMONALITY}$ calculated for a group can then be used as the relevance metric $317_{RELEVANCE}$ for that group in the next iteration. Thus, relevance metric is readily available for all feasible candidates in the next iteration.

In some embodiments, an additional tuple growth metric $317_{GROWTH}$ is applied to groups that meet the commonality threshold. The tuple growth metric $317_{GROWTH}$ measures the likelihood of additional alert types being feasibly added to an identified group, and is thus suited for iterative detection of growing alert groups. Starting from a discovered alert group sx, to predict whether it can be grown by the addition of alert type sy to describe an attack (sx, sy), the tuple growth metric $317_{GROWTH}$ could be calculated as G(sx, sy)=R(sx, sy)/R(sx). The tuple growth metric $317_{GROWTH}$ can also be utilized as a measure of predictive actions. For example, if a subgroup of alerts sx has been detected, to determine which additional alerts sa, sb, sc, sn would be the most likely to occur as part of the attack partly described by sx, the values G(sx, sa), G(sx, sb), G(sx, sc) G(sx, sn) could be calculated and compared. Note that after calculating the commonality metric $317_{COMMONALITY}$, the components for calculating the tuple growth metric $317_{GROWTH}$ are readily available.

Figure 6:
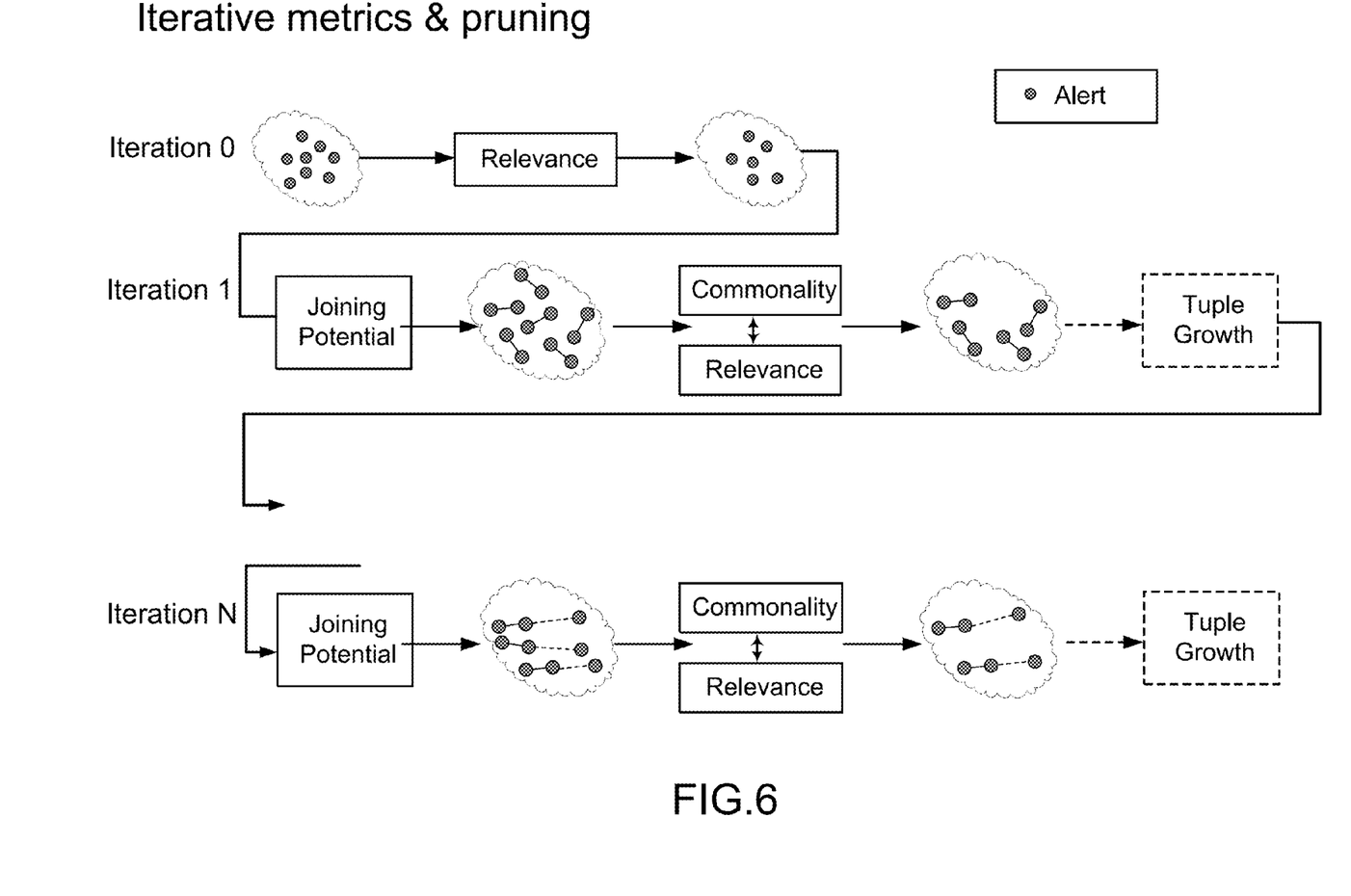
FIG. 6 illustrates an example of multiple iteration alert grouping, according to one embodiment.

Turning now to FIG. 6, a specific example use case is described in which specific thresholds for these metrics 317 are adapted in multiple iterations. In this example, the thresholds are adjusted to discover tuples 307 identifying complex multipart attacks that become increasingly focused, such as a complex attack that begins with broad probing and becomes more targeted in its later stages. In the first iteration, after calculating the relevance metric $317_{RELEVANCE}$ for individual alert types in the telemetry 301 sample, the alert type grouping manager 101 attempts to join individual alerts into feasible pairs. Because the alert type grouping manager 101 is attempting to discover complex attacks that initially engage in a broad probing behavior, the joining potential threshold in the first iteration is set to a relatively low value, for example to J>=0.6. Suppose the candidate alerts sx and sy are evaluated for joining potential where R(sx)=0.5 and R(sy)=0.3. The joining potential for (sx, sy) equals 0.3/0.5=0.6 (recall, J(sx, sy)=min(R(sx), R(sy))/max(R(sx), R(sy))), and thus the pair meets the threshold. In the example being discussed, during calculation of the commonality metric for (sx, sy), the alert type grouping manager 101 determines that the relevance metric R for (sx, sy) equals 0.2.

In the next iteration, the alert type grouping manager 101 looks to add third alerts to the discovered pairs (e.g., extending groups of two alerts to three). Because the attacks for which the alert type grouping manager 101 is currently attempting to discover tuples 307 are expected to become more focused after the initial broad probing phase, more focused attack behavior is looked for in this iteration. Therefore, a higher joining potential threshold would be used, such as J>=0.8. Suppose candidate alerts sw and sz are evaluated, where R(sw)=0.16 and R(sz)=0.18. For sw, the joining potential J((sx, sy), sw)=0.8, which meets the threshold of >=0.8, so group (sx, sy, sw) would be considered feasible. The joining potential J((sx, sy), sz)=0.9, which also meets the threshold, so group (sx, sy, sz) is adjudicated feasible as well.

To attempt to identify even more focused attacks at this stage, the commonality threshold could be set to C=0.7. For R((sx, sy), sw)=0.12 and R((sx, sy), sz)=0.12, only the triple group (sx, sy, sw) would be kept, because C((sx, sy), sw)=0.75 which meets the threshold, whereas C((sx, sy), sz)=0.66, which does not.

The alert type grouping manager 101 can proceed iteratively to discover successively longer alert type groupings, for example using additional passes of the above-described iterative functionality. For example, quadruplets could be discovered by processing identified triplets. Iterative discovery of increasingly larger groupings can be stopped according to different criteria in different embodiments and under different circumstances. In one embodiment, iteration can terminate at a maximum length value set by a vendor or system administrator or the like. For example, it could be administratively determined to discover alert type grouping only up to some length k (i.e., find tuples 307 such as (a1, a2, a3, . . . , ak)). The iterative searching can also be terminated at a length at which it is dynamically determined that instances of groups (or groups with requisite confidence levels) are sufficiently rare. At what point and under which specific circumstances to break out of the above-described iterative processing is a variable design parameter.

By executing the functionality described above, a collection of tuples 307 identifying complex attacks with different properties is created. A tuple storing module 321 of the alert type grouping manager 101 can store the tuples 307, for example in a repository 321 or other suitable mechanism, along with relevant attributes, such as characterizations of attack properties, confidence levels, affected population sizes, spans of attacks sources 303, etc. Once discovered, tuples 307 can be deployed and utilized in a number of ways. For example, tuples 307 can be distributed to endpoint computers 210 and organizations for use in the detection of and protection against complex multipart attacks. At the endpoint level, a tuple 307 can serve as a type of an advanced security signature which identifies a complex, multipart attack. Tuples 307 can also be utilized by a centralized provider of security services (e.g., a commercial security services vendor), for example in the context of various security analytics, such as identification of targeted attacks, detection of attack variations and evasive actions, spread of attacks, identification of launching infrastructures, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using tunable metrics for iterative discovery of groups of security alert types that identify complex, multipart attacks with different properties, the method comprising:
   identifying alerts in a given sample of security telemetry, each specific identified alert having been generated by a triggering of a given signature on a specific computing device, each specific alert containing at least an identifier of the triggering signature, an identifier of a corresponding invoking source, and an identifier of the specific computing device on which the specific alert was generated;
   iteratively traversing the identified alerts, and calculating metrics corresponding to alerts and alert groups, the calculated metrics quantifying feasibility for inclusion in tuples identifying multipart attacks with specific properties, wherein iteratively traversing the identified alerts and calculating metrics corresponding to alerts and alert groups further comprises iteratively calculating relevance metrics corresponding to specific alerts and alert groups, each calculated relevance metric quantifying a likelihood of individual sources generating a corresponding specific alert or alert group, as a function of i) a total number of sources in the sample of security telemetry and ii) a number of sources in the sample of security telemetry that generate the specific alert or alert group; and
   iteratively joining alerts and successively larger alert groups into tuples describing multipart attacks with specific properties, responsive to alerts and alert groups meeting thresholds based on corresponding calculated metrics.

2. The method of claim 1 wherein iteratively traversing the identified alerts and calculating metrics corresponding to alerts and alert groups further comprises:
   iteratively calculating metrics corresponding to evaluation components, and successively adding only those evaluation components that meet specific thresholds based on calculated metrics to alert groups, thereby identifying successively larger alert groups that describe given multipart attacks with different properties.

3. The method of claim 1 wherein iteratively traversing the identified alerts and calculating metrics corresponding to alerts and alert groups further comprises:
   during a first iteration, calculating specific metrics corresponding to individual alerts, and during subsequent iterations, calculating specific metrics only for those alerts and alert groups that have met corresponding metric-based thresholds during prior iterations.

4. The method of claim 1 wherein iteratively traversing the identified alerts and calculating metrics corresponding to alerts and alert groups further comprises:
   adjusting at least one metric-based threshold between iterations, based on properties of at least one multipart attack for which evaluation components are being identified.

5. The method of claim 1 wherein calculating a relevance metric corresponding to a specific alert or to a specific alert group further comprises:
   calculating the relevance metric by dividing the number of sources in the sample of security telemetry that generate the specific alert or alert group by the total number of sources in the sample of security telemetry.

6. The method of claim 1 wherein iteratively calculating relevance metrics corresponding to specific alerts and alert groups further comprises:
   during a first iteration calculating relevance metrics corresponding to alerts, and during subsequent iterations calculating relevance metrics corresponding to alert groups that have not been eliminated from further consideration for failing to meet a metric-based threshold.

7. The method of claim 1 wherein iteratively traversing the identified alerts and calculating metrics corresponding to alerts and alert groups further comprises:
   iteratively calculating joining potential metrics corresponding to pairs of evaluation components, each calculated joining potential metric quantifying an assessment of a likelihood of a first evaluation component of a specific pair and a second evaluation component of the specific pair having a threshold quantity of common originating sources.

8. The method of claim 7 wherein calculating a joining potential metric corresponding to a specific pair of evaluation components further comprises:
   calculating the joining potential metric corresponding to the specific pair of evaluation components as a function of disparity between a relevance metric corresponding to the first evaluation component and a relevance metric corresponding to the second evaluation component.

9. The method of claim 7 wherein iteratively calculating joining potential metrics corresponding to pairs of evaluation components further comprises:
   during a first iteration calculating joining potential metrics corresponding to pairs of alerts, and during subsequent iterations calculating joining potential metrics corresponding to combinations of successively larger alert groups and additional alerts, wherein the alert groups and additional alerts have not been eliminated from further consideration for failing to meet a metric-based threshold.

10. The method of claim 7 further comprising:
    setting a joining potential metric threshold to a value of one in order to identify evaluation components that are triggered by an equal number of sources as a specific multipart attack, and lowering the joining potential metric to identify evaluation components with varied distribution across originating sources.

11. The method of claim 1 wherein iteratively traversing the identified alerts and calculating metrics corresponding to alerts and alert groups further comprises:
    iteratively calculating commonality metrics corresponding to pairs of evaluation components, each calculated commonality metric quantifying a discrepancy between an actual number of common sources for both evaluation components of a specific pair, and a number of common sources for both evaluation components of the specific pair as predicted by a corresponding joining potential metric.

12. The method of claim 11 wherein calculating a commonality metric corresponding to a specific pair of evaluation components further comprises:
    calculating the commonality metric corresponding to the specific pair of evaluation components by dividing a relevance metric corresponding to the specific pair of evaluation components by a minimum relevance metric corresponding to either evaluation component of the pair.

13. The method of claim 11 further comprising:
setting a commonality metric threshold to a value of one in order to discover evaluation components that occur as often as a multipart attack of which they are a part, or lowering the commonality metric threshold to discover evaluation components that occur more frequently than the multipart attack.

14. The method of claim 1 wherein iteratively traversing the identified alerts and calculating metrics corresponding to alerts and alert groups further comprises:
iteratively calculating tuple growth metrics corresponding to combinations of identified alert groups and additional alerts, each calculated tuple growth metric quantifying a likelihood of a specific identified alert group being grown by the addition of a specific additional alert.

15. The method of claim 14 wherein calculating a tuple growth metric corresponding to a specific combination of a specific identified alert group and a specific additional alert further comprises:
calculating the tuple growth metric corresponding to the specific combination by dividing a relevance metric corresponding to the specific combination by a relevance metric corresponding to the specific additional alert.

16. The method of claim 1 wherein identifying alerts in a given sample of the received security telemetry further comprises:
identifying alerts of given types in the given sample of the received security telemetry.

17. The method of claim 1 further comprising:
providing tuples to a plurality of endpoint computing devices where tuples are utilized as signatures to detect and defend against multipart attacks.

18. At least one non-transitory computer readable medium for using tunable metrics for iterative discovery of groups of security alert types that identify complex, multipart attacks with different properties, the at least one non-transitory computer readable medium storing computer executable instructions that, when loaded into computer memory and executed by at least one processor of at least one computing device, cause the at least one computing device to perform the following steps:
identifying alerts in a given sample of security telemetry, each specific identified alert having been generated by a triggering of a given signature on a specific computing device, each specific alert containing at least an identifier of the triggering signature, an identifier of a corresponding invoking source, and an identifier of the specific computing device on which the specific alert was generated;
iteratively traversing the identified alerts, and calculating metrics corresponding to alerts and alert groups, the calculated metrics quantifying feasibility for inclusion in tuples identifying multipart attacks with specific properties, wherein iteratively traversing the identified alerts and calculating metrics corresponding to alerts and alert groups further comprises iteratively calculating relevance metrics corresponding to specific alerts and alert groups, each calculated relevance metric quantifying a likelihood of individual sources generating a corresponding specific alert or alert group, as a function of i) a total number of sources in the sample of security telemetry and ii) a number of sources in the sample of security telemetry that generate the specific alert or alert group; and
iteratively joining alerts and successively larger alert groups into tuples describing multipart attacks with specific properties, responsive to alerts and alert groups meeting thresholds based on corresponding calculated metrics.

19. A centralized computing system for using tunable metrics for iterative discovery of groups of security alert types that identify complex, multipart attacks with different properties, the centralized computing system comprising:
at least one processor;
system memory;
an alert identifying software module residing in the system memory, the alert identifying software module being programmed to identify alerts in a given sample of security telemetry, each specific identified alert having been generated by a triggering of a given signature on a specific computing device, each specific alert containing at least an identifier of the triggering signature, an identifier of a corresponding invoking source, and an identifier of the specific computing device on which the specific alert was generated;
a metric calculating software module residing in the system memory, the metric calculating software module being programmed to iteratively traverse the identified alerts, and to calculate metrics corresponding to alerts and alert groups, the calculated metrics quantifying feasibility for inclusion in tuples identifying multipart attacks with specific properties, wherein iteratively traversing the identified alerts and calculating metrics corresponding to alerts and alert groups further comprises iteratively calculating relevance metrics corresponding to specific alerts and alert groups, each calculated relevance metric quantifying a likelihood of individual sources generating a corresponding specific alert or alert group, as a function of i) a total number of sources in the sample of security telemetry and ii) a number of sources in the sample of security telemetry that generate the specific alert or alert group; and
a tuple discovering software module residing in the system memory, the tuple discovering software being programmed to iteratively join alerts and successively larger alert groups into tuples describing multipart attacks with specific properties, responsive to alerts and alert groups meeting thresholds based on corresponding calculated metrics.

* * * * *